May 11, 1971     I. M. LACHMAN     3,578,471

THERMAL SHOCK RESISTANT CERAMIC MATERIAL

Filed Nov. 10, 1969

INVENTOR
IRWIN M. LACHMAN

BY *Sughrue, Rothwell, Mion,*
*Zinn & Macpeak*

ATTORNEYS

United States Patent Office 3,578,471
Patented May 11, 1971

3,578,471
THERMAL SHOCK RESISTANT CERAMIC MATERIAL
Irwin M. Lachman, Corning, N.Y., assignor to Corning Glass Works, Corning, N.Y.
Continuation-in-part of application Ser. No. 668,067, Sept. 15, 1967. This application Nov. 10, 1969, Ser. No. 875,174
Int. Cl. C04b 35/00, 35/44
U.S. Cl. 106—39         12 Claims

ABSTRACT OF THE DISCLOSURE

Ceramic bodies composed of a plurality of phases having markedly different coefficients of thermal expansion. The ceramic bodies are characterized by grain boundary and intracrystalline cracking. The ceramics have compositions analytically defined by and selected from the groups consisting of: (1) first compositions in the area and along the boundaries defined by the letters A, B, C, D, E, F, G, M, N in FIG. 1 of the drawing; (2) second compositions in the area and along the boundaries defined by the letters A', B', C', D', E', F', G', M', N' in FIG. 2 of the drawing, and (3) mixtures of said first and second compositions.

---

This application is a continuation-in-part of U.S. Ser. No. 668,067, filed Sept. 15, 1967, now abandoned.

In the drawing, $R_xO_y$ can be either $Al_2O_3$ or $$Al_2O_3 + ZnO$$

where the ZnO does not exceed 65.8 wt. percent. $R_aO_b$ can be either $Fe_2O_3$ or $Fe_2O_3 + ZnO$ where the ZnO does not exceed 65.4 wt. percent.

Replacement by ZnO is on a 1 wt. percent for 1 wt. percent basis. Thus, the composition of this invention are basically either MgO, $TiO_2$ and $Al_2O_3$ and/or $Fe_2O_3$ wherein up to 65.8 wt. percent of $Al_2O_3$ may be replaced by ZnO and up to 65.4 wt. percent of $Fe_2O_3$ may be replaced by ZnO on a 1 wt. percent for 1 wt. percent basis.

Compositions especially preferred are analytically defined by and selected from the groups consisting of: (1) first compositions in the area and along the boundaries of the letters F, G, M, N, H, I, J, K, L in FIG. 1; (2) second compositions in the area and along the boundaries defined by the letters F', G', M', N', I', J', K', L' in FIG. 2, and (3) mixtures of said first and second compositions. In the preferred compositions, up to 40.5 wt. percent of $Al_2O_3$ may be replaced by ZnO and up to 30.2 wt. percent of $Fe_2O_3$ may be replaced by ZnO on a 1 wt. percent for 1 wt. percent basis. Articles are made by molding, pressing or otherwise forming and then firing in the sintering range of the materials in an oxidizing atmosphere. Preferred products are liners for exhaust manifolds to facilitate complete combustion of exhaust gases from internal combustion engines or the like and thereby reduce air pollution. These compositions are resistant to chemical attack by the exhaust gases.

BACKGROUND OF THE INVENTION

(1) Field of the invention

The present invention relates to thermal shock resistant ceramics composed of MgO, $TiO_2$ and $Al_2O_3$ and/or $Fe_2O_3$. Compositions also include ones in which up to 65.8 wt. percent of the $Al_2O_3$ and up to 65.4 wt. percent of the $Fe_2O_3$ may be replaced by ZnO on a 1 wt. percent for 1 wt. percent basis. The present invention also relates to articles formed therefrom, especially liners for exhaust manifolds or the like.

(2) Description of the prior art

The prior art discloses numerous ceramic compositions, but most are not sufficiently resistant to extreme thermal shock. Materials are presently being sought to serve as liners for automobile exhaust manifolds, so that the temperature in the manifold may be kept sufficiently high to permit substantially complete combustion of residual hydrocarbons, thereby reducing air-pollution.

In extreme conditions, an auto manifold liner at sub-freezing temperatures may suddenly be exposed to hot exhaust gases at 1400° C. In addition to the ability to resist severe thermal shock, the ceramic must also be sufficiently refractory to withstand temperatures on the order of 1400° C., and must have adequate resistance to chemical corrosion by the hot exhaust gases.

Prior art ceramics have generally failed with respect to one or more of these properties.

Therefore, the object of the present invention is to provide ceramic materials capable of resisting severe thermal shock and having sufficient refractoriness and corrosion resistance to withstand contact with hot exhaust gases. A collateral object is to provide ceramic material having the foregoing properties which can be readily fabricated into a variety of desired structural shapes.

SUMMARY OF THE INVENTION

It has now been discovered that certain ceramic compositions composed of MgO, $TiO_2$ and $R_xO_y$ and/or $R_aO_b$, provide articles which possess unique thermal shock characteristics. The compositions are analytically defined by and selected from the groups consisting of: (1) first compositions in the area and along the boundaries defined by the letters A, B, C, D, E, F, G, M, N in FIG. 1; (2) second compositions in the area and, along the boundaries defined by the letters A', B', C', D', E', F', G', M', N' in FIG. 2, and (3) mixtures of said first and second compositions. $R_xO_y$ can be either $Al_2O_3$ or $Al_2O_3 + ZnO$ where the ZnO does not exceed 65.8 wt. percent. $R_aO_b$ can be either $Fe_2O_3$ or $Fe_2O_3 + ZnO$ where the ZnO does not exceed 65.4 wt. percent.

Replacement by ZnO is on a 1 wt. percent for 1 wt. percent basis. Thus, the compositions of the invention are basically either MgO, $TiO_2$ and $Al_2O_3$ and/or $Fe_2O_3$ wherein up to 65.8 wt. percent of $Al_2O_3$ may be replaced by ZnO and up to 65.4 wt. percent of $Fe_2O_3$ may be replaced by ZnO on a 1 wt. percent for 1 wt. percent basis.

Compositions especially preferred are analytically defined by and selected from the groups consisting of: (1) first compositions in the area and along the boundaries of the letters F, G, M, N, H, I, J, K, L in FIG. 1; (2) second compositions in the area and along the boundaries defined by the letters F', G', M', N', H', I', J', K', L' in FIG. 2; and (3) mixtures of said first and second compositions in all proportions. In the preferred compositions, up to 40.5 wt. percent of $Al_2O_3$ may be replaced by ZnO and up to 30.2 wt. percent of $Fe_2O_3$ may be replaced by ZnO on a 1 wt. percent for 1 wt. percent basis.

BRIEF DESCRIPTION OF THE DRAWINGS

The compositions at the points of the figures are as follows:

FIG. 1

Figure 1:
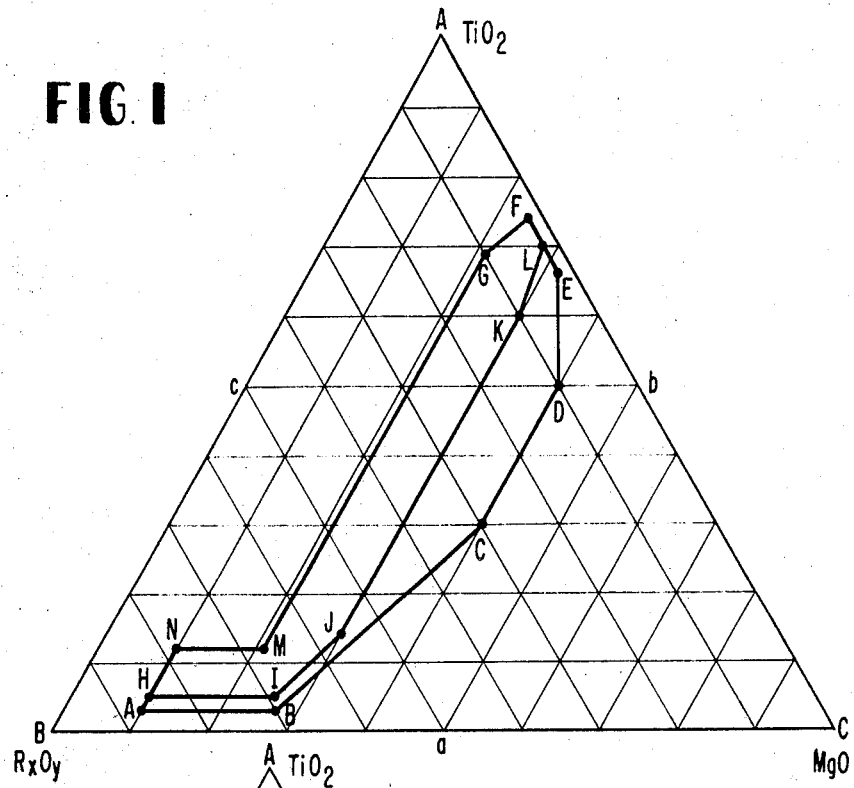
FIGS. 1 and 2 comprise ternary compositional diagrams of the systems $R_xO_y$-MgO-$TiO_2$ and $R_aO_b$-MgO-$TiO_2$, respectively. On each, the compositional limits of the ceramic compositions of the invention are indicated by the boundaries and the areas defined by the letters A, B, C, D, E, F, G, M, N and A', B', C', D' E', F', G', M', N' for drawings No. 1 and No. 2 respectively. The preferred composition limits are indicated by the boundaries and the areas defined by the letters F, G, M, N, H, I, J, K, L and F', G', M', N', H', I', J', K', L' for FIGS. No. 1 and No. 2, respectively.

| Point | Weight percent | | |
|---|---|---|---|
| | $R_xO_y$ | MgO | $TiO_2$ |
| A | 87 | 10 | 3 |
| B | 70 | 27 | 3 |
| C | 30 | 40 | 30 |
| D | 10 | 40 | 50 |
| E | 2 | 32 | 66 |
| F | 2 | 23 | 75 |
| G | 10 | 21 | 69 |
| H | 85 | 10 | 5 |
| I | 69 | 26 | 5 |
| J | 56 | 30 | 14 |
| K | 10 | 30 | 60 |
| L | 2 | 28 | 70 |
| M | 67 | 21 | 12 |
| N | 78 | 10 | 12 |

$R_xO_y$ can be either $Al_2O_3$ or $Al_2O_3+ZnO$ where the ZnO does not exceed 65.8 wt. percent.

FIG. 2

| Point | Weight percent | | |
|---|---|---|---|
| | $R_aO_b$ | MgO | $TiO_2$ |
| A' | 92 | 6 | 2 |
| B' | 79 | 19 | 2 |
| C' | 32 | 37 | 31 |
| D' | 11 | 37 | 52 |
| E' | 2 | 32 | 66 |
| F' | 2 | 23 | 75 |
| G' | 8 | 21 | 71 |
| H' | 90 | 6 | 4 |
| I' | 78 | 18 | 4 |
| J' | 47 | 30 | 23 |
| K' | 10 | 30 | 60 |
| L' | 2 | 28 | 70 |
| M' | 67 | 21 | 12 |
| N' | 82 | 6 | 12 |

$R_aO_b$ can be either $Fe_2O_3$ or $Fe_2O_3+ZnO$ where the ZnO does not exceed 65.4 wt. percent.

DETAILED DESCRIPTION OF THE INVENTION

The ceramics of the present invention may be prepared from readily available oxide components. For example, suitable ceramics can be prepared from raw materials such as Alcoa A-2 $Al_2O_3$ (−325 mesh), Michigan Magnesite, Magmaster No. 1 MgO (−200 mesh), and Titanium Alloy Mfg. Co. Frit Makers $TiO_2$. Muscle Shoals Fused Spinel Grade C-60 (−200 mesh) may be substituted for alumina and magnesia in the case of compositions rich in magnesium aluminate spinel, and Muscle Shoals Fused Alumina Grade A-20 (−200 mesh) may be substituted for the finer Alcoa A-2 alumina.

Typical oxide formulations for the production of ceramic bodies in accordance with this invention are set forth in the following Table No. 1 as Formulations Nos. 1 through 8, 12, and 13. Formulations Nos. 9, 10 and 11 are control compositions falling outside the scope of this invention and used in thermal shock tests for comparison purposes.

Table No. 2 shows clearly that the compositions falling within the scope of this invention are thermal shock resistant. Microscopic examination shows the presence of intracrystalline and grain boundary cracking in the case of the thermal shock resistant compositions, but little or no cracking in the case of the control specimens.

TABLE 2.—THERMAL SHOCK TEST RESULTS

| Thermal shock test | No. of thermal shock cycles without failure | | |
|---|---|---|---|
| | [1] A | [2] B | [3] C |
| Formulation Number from Table 1: | | | |
| 1 | 35 | 25 | |
| 2 | | 25 | |
| 3 | | 25 | |
| 4 | | 25 | |
| 5 | | | >20 |
| 6 | | | 36 |
| 7 | | | >30 |
| 9 | 0 | 5 | |
| 10 | | 5 | |
| 11 | | | 0 |

[1] Bars, approximately 6″ x 1″ x ¾″ were exposed to gases at 1,400° C. and then to room temperature air in each cycle.
[2] Bars, approximately 3″ x ½″ x ⅜″ were exposed to gases at 1,400° C., and then plunged into water in each cycle.
[3] Bars, approximately 1″ x 6″ x ⅛″, constantly stressed at about 150 p.s.i., were exposed to gases at 1,400° C., and allowed to cool under room temperature conditions in each cycle.

Ceramic articles of the foregoing compositions may be prepared in a number of ways. For example suitable articles may be made by dry pressing, injection molding, casting and other known procedures. This is followed by firing of the green article in an oxidizing atmosphere to sufficiently elevated temperatures, generally on the order of at least about 1350° C., for compositions containing a substantial amount of $Fe_2O_3$ and at least about 1550° C., for other compositions containing significant amounts of $Al_2O_3$.

As a example of the production of ceramic articles, a 50 gram batch of any of the compositions of Table 1 is mixed with Chlorothene (Dow Chemical Co.'s inhibited, 1,1,1-trichloroethane), 3 wt. percent of a binder, such as, a polyethylene glycol, e.g., Carbowax 4000, and a few drops of fish oil, as a defluocculant. After drying, the batch is granulated and pressed at about 5,000 to 10,000 p.s.i. in a ½″ diameter die to form pellets. The green pressed article is then fired in a gas, electric or other furnace, in an oxidizing atmosphere. Bars or other shapes may be dry pressed in a similar manner.

Ceramic articles may also be formed by mixing the dry oxide powder formulations of Table 1 with a suitable liquid carrier and then pressing or injection molding the slurry to form an article of the desired shape. For example, in accordance with U.S. Pat. No. 3,330,892, issued July 11, 1967, in the name of E. Herrmann, a batch of the oxide powder formulations of Table 1 may be mixed with p-dichlorobenzene, about 20 gms. per 100 gms. of the batch. A deflocculant, such as zinc stearate, and a binder such as a polyethylene glycol, e.g., Car-

TABLE NO. 1.—TYPICAL OXIDE FORMULATIONS

| Formulation No.: | Percent by weight | | | | | | |
|---|---|---|---|---|---|---|---|
| | Alcoa A-2 $Al_2O_3$ (−325 M) | Michigan Magnesite Magmaster No. 1 MgO (−200 M) | Frit makers $TiO_2$ | Muscle Shoals fused spinel grade C-60 (−200 M) | ZnO B & A reagent grade | Muscle Shoals fused $Al_2O_3$ grade A-20 (−200 M) | Columbian Carbon Co. $Fe_2O_3$ Mapico Red |
| 1 | 70 | 24 | 6 | | | | |
| 2 | 9 | | 6 | 85 | | | |
| 3 | 70 | 22 | 8 | | | | |
| 4 | 14.1 | | 8 | 77.9 | | | |
| 5 | | 12.0 | 6 | 42.5 | | 39.5 | |
| 6 | | 11.0 | 8 | 39.0 | | 35.0 | 7.0 |
| 7 | | 10.0 | 43.0 | | | | 47.0 |
| 8 | | 14.2 | 10.0 | | | | 75.8 |
| 9 | 72 | 26 | 2 | | | | |
| 10 | 6 | | 2 | 91.9 | | | |
| 11 | | 13.0 | 2 | 46.0 | | 39.0 | |
| 12 | 58.0 | 12 | 10 | | 20 | | |
| 13 | 2.0 | 25 | 60 | | 13 | | | bowax 20M, each in an amount of about 1 gm. per 100 gms. of the batch are also preferably added. The raw batch, having about 70% solids by volume, may then be pressed at about 3,000 p.s.i. to form the desired article which is then fired. The same slurry may be injection molded in satisfactory fashion at a pressure of 6,000 p.s.i.

The following are detailed examples of the preparation of ceramic articles in accordance with the invention:

EXAMPLE 1

Using oxide Formulation No. 1 of Table 1, 70 gms. of alumina (ALCOA A-2, −325 mesh), 24 gms. of MgO (Michigan Magnesite, Magmaster #1, −200 mesh) and 6 gms. of $TiO_2$ (Titanium Alloy Mfg. Frit Makers $TiO_2$) were hand mixed together with 3 gms. of a polyethylene glycol binder, specifically Carbowax 4000, as a temporary binder. Enough Chlorothene (Dow Chemical Co's inhibited 1,1,1-trichloroethane) was used so that the batch attained the consistency of a slurry. The slurry was dried, granulated through a 20 mesh screen and then pressed at 5,000 p.s.i. to form parts. The pressed parts were then fired in a gas-fired furnace in an oxidizing atmosphere at 1650° C., for 5 hours.

EXAMPLE 2

Using oxide Formulation Number 5 of Table 1, 1185 gms. of $Al_2O_3$ (ALCOA A-2, −325 mesh), 180 gms. of $TiO_2$ (Titanium Alloy Mfg., Frit Makers $TiO_2$), 1275 gms. of $MgO \cdot Al_2O_3$ spinel Muscle Shoals Fused Spinel, Grade C-60 (−200 mesh), 360 gms. MgO (Michigan Magnesite, Magmaster #1 −200 mesh), 18.54 gms. paradichlorobenzene, 30 gms. of Carbowax 20M, as a temporary binder, and 60 gms. of zinc stearate were mixed together in a one gallon kneading-type mixer at 80° C. The batch was then transfer molded into parts at 5000 p.s.i. These parts were then fired at 1650° C., for 2 hours in a gas-fired furnace in an oxidizing atmosphere.

EXAMPLE 3

Using Formulation No. 6 of Table 1, 975 gms. of $MgO \cdot Al_2O_3$ Muscle Shoals Fused Spinel, Grade C-60, (−200 mesh), 875 gms. of $Al_2O_3$, Muscle Shoals Fused $Al_2O_3$, Grade A-20 (−200 mesh), 275 gms. of MgO, Michigan Magnesite, Magmaster No. 1 (−200 mesh), 200 gms. of $TiO_2$ Frit Makers Grade, 175 gms. of $F_2O_3$, Columbian Carbon Co. Mapico Red #297, 400 gms. of paradichlorobenzene, 25 gms. of Carbowax 20M, as a temporary binder, and 50 gms. of zinc stearate were mixed together in a one gallon kneading-type mixer at 80° C. The batch was then transfer molded into parts at 5000 p.s.i. These parts were then fired at various temperatures from 1600–1650° C., for various lengths of time from 2–5 hours, in an oxidizing atmosphere in a gas-fired furnace.

Exhaust manifold liners corresponding to the composition of Formulation No. 6 were fabricated essentially as described above and tested in a 289 C.I.D. Ford V-8 gasoline engine. A liner has withstood 100 cycles of starting from room or a relatively low temperature and running for 20–40 minutes. No failure has occurred due to thermal shock and no evidence of corrosion can be seen.

EXAMPLE 4

Using Formulation No. 8 of Table 1, 18.95 gms. of $Fe_2O_3$ (Columbian Carbon Co., Mapico Red #516), 3.55 gms. of MgO (Michigan Magnesite, Magmaster #1, −200 mesh), 2.5 gms. $TiO_2$ (Titanium Alloy Mfg., Frit Makers $TiO_2$) were hand mixed together in enough Chlorothene (Dow Chemical Co.'s inhibited 1,1,1-trichloroethane) to form a slurry and then dried and granulated. The powder was then pressed into ½″ dia. pellets at 10,000 p.s.i., and fired at 1400° C., for 2 hours in a gas-fired furnace in an oxidizing atmosphere.

EXAMPLE 5

Using Formulation No. 12 of Table 1, 500 gms. of a batch comprising, on a percent by weight basis, 58.0% Alcoa A-2 alumina (−325 M), 12% Michigan Magnesite Magmaster #1 MgO (−200 M), 10% TAM Frit Makers $TiO_2$, and 20% B & A Reagent ZnO were dry mixed together by ball milling for 15 mins., 20 gms. of a polyethylene glycol binder, specifically Carbowax 4000, were then added by making a slurry with chlorothene (Dow Chemical Co.'s inhibited 1,1,1-trichloroethane). This was dried and the powder pressed at 10,000 p.s.i. into parts. These parts were fired in a gas furnace at 1650° C., for 2 hours in an oxidizing atmosphere.

Figure 2:
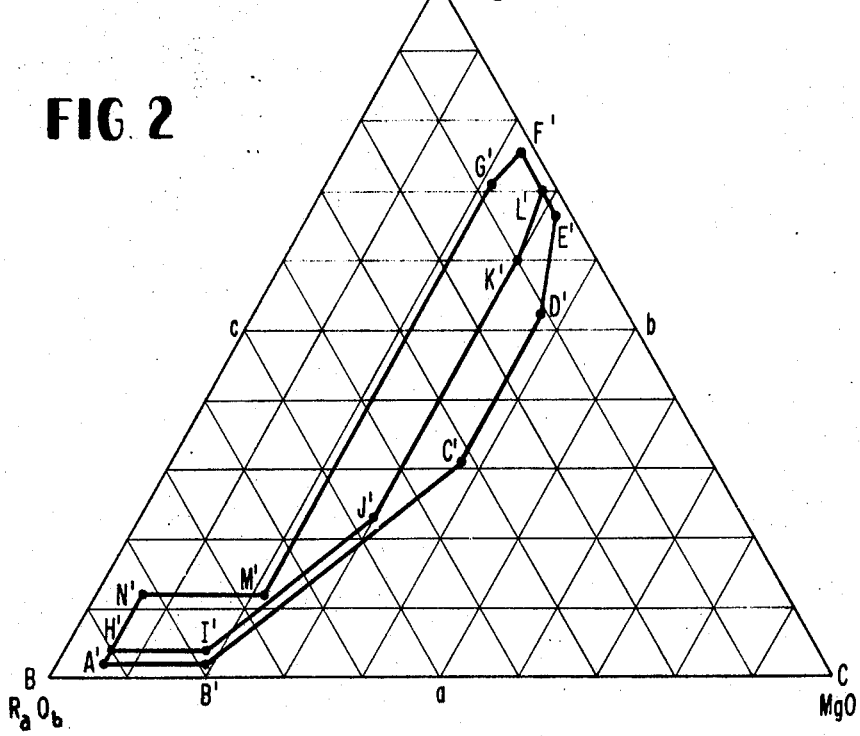

What is claimed is:

1. A ceramic article which is characterized by grain boundary and intracrystalline cracking and resistance to extreme thermal shock and corrosion by exhaust gases, said article having the composition analytically defined, on a percent by weight basis, by and selected from the group consisting of: (1) a first composition in the area or along the boundaries defined by the letters A, B, C, D, E, F, G, M, N in FIG. 1 of the drawing in which $R_xO_y$ is selected from the group consisting of $Al_2O_3$ and $Al_2O_3+ZnO$ where ZnO does not exceed 65.8 wt. percent; (2) a second composition in the area or along the boundaries defined by the letters A′, B′, C′, D′, E′, F′, G′, M′, N′ in FIG. 2 of the drawing in which $R_aO_b$ is selected from the group consisting of $Fe_2O_3$ and $Fe_2O_3+ZnO$ where ZnO does not exceed 65.4 wt. percent; and (3) a mixture of a said first and a second compositions.

2. A ceramic article which is characterized by grain boundary and intracrystalline cracking and resistance to extreme thermal shock and corrosion by exhaust gases, said articles having the composition analytically defined, on a percent by weight basis, by and selected from the group consisting of: (1) a first composition in the area or along the boundaries defined by the letters F, G, M, N, H, I, J, K, L in FIG. 1 of the drawing in which $R_xO_y$ is selected from the group consisting of $Al_2O_3$ and $Al_2O_3+ZnO$ where ZnO does not exceed 40.5 wt. percent; (2) a second composition in the area or along the boundaries defined by the letters F′, G′, M′, N′, H′, I′, J′, K′, L′ in FIG. 2 of the drawing in which $R_aO_b$ is selected from the group consisting of $Fe_2O_3$ and $Fe_2O_3+ZnO$ where ZnO does not exceed 30.2 wt. percent; and (3) a mixture of a said first and a said second compositions.

3. A ceramic article, as defined in claim 1, having a composition, on a percent by weight basis, in the area or along the boundaries defined by the letters A, B, C, D, E, F, G, M, N in FIG. 1 of the drawing in which $R_xO_y$ is selected from the group consisting of $Al_2O_3$ and $Al_2O_3+ZnO$ where ZnO does not exceed 65.8 wt. percent.

4. A ceramic article, as defined in claim 1, having a composition, on a percent by weight basis, in the area or along the boundaries defined by the letters A′, B′, C′, D′, E′, F′, G′, M′, N′ in FIG. 2 of the drawing in which $R_aO_b$ is selected from the group consisting of $Fe_2O_3$ and $Fe_2O_3+ZnO$ where ZnO does not exceed 65.4 wt. percent.

5. A ceramic article, as defined in claim 2, having a composition, on a percent by weight basis, in the area or along the boundaries defined by the letters F, G, M, N, H, I, J, K, L in FIG. 1 of the drawing in which $R_xO_y$ is selected from the group consisting of $Al_2O_3$ and $Al_2O_3+ZnO$ where ZnO does not exceed 40.5 wt. percent.

6. A ceramic article, as defined in claim 2, having a composition, on a percent by weight basis, in the area or along the boundaries defined by letters F′, G′, M′, N′, H′, I′, J′, K′, L′ in FIG. 2 of the drawing in which $R_aO_b$ is selected from the group consisting of $Fe_2O_3$ and $Fe_2O_3+ZnO$ where ZnO does not exceed 30.2 wt. percent.

7. A ceramic article, as defined in claim 3, wherein $R_xO_y$ is solely $Al_2O_3$.

8. A ceramic article, as defined in claim 4, wherein $R_aO_b$ is solely $Fe_2O_3$.

9. A ceramic article, as defined in claim 1, wherein $R_xO_y$ is solely $Al_2O_3$ and $R_aO_b$ is solely $Fe_2O_3$.

10. A ceramic article, as defined in claim 5, wherein $R_xO_y$ is solely $Al_2O_3$.

11. A ceramic article, as defined in claim 6, wherein $R_xO_y$ is solely $Fe_2O_3$.

12. A ceramic article, as defined in claim 2, wherein $R_xO_y$ is solely $Al_2O_3$ and $R_aO_b$ is solely $Fe_2O_3$.

References Cited

UNITED STATES PATENTS 3,316,108  4/1967  Blomberg _____ 106—62

FOREIGN PATENTS 1,349,020  12/1963  France _____ 106—65

OTHER REFERENCES

Levin et al., Phase Diagrams for Ceramists, A.M. Cer. Soc., 1964, p. 247. (Sci. Lib. Q.D. 501 L.H.)

JAMES E. POER, Primary Examiner

U.S. Cl. X.R.

106—58, 60, 62, 65